United States Patent
Kostakis (10) Patent No.: US 11,294,895 B1
(45) Date of Patent: *Apr. 5, 2022

(54) SYSTEMS AND METHODS FOR GENERATING ANONYMIZED SOFTWARE-BUG ALERTS FROM QUERY COMMENTS

(71) Applicant: Snowflake Inc., Bozeman, MT (US)

(72) Inventor: Orestis Kostakis, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,932

(22) Filed: Nov. 23, 2021

Related U.S. Application Data (63) Continuation of application No. 17/241,745, filed on Apr. 27, 2021, now Pat. No. 11,188,528.

(60) Provisional application No. 63/143,803, filed on Jan. 30, 2021.

(51) Int. Cl.
*G06F 16/24* (2019.01)
*G06F 16/245* (2019.01)
*G06F 11/36* (2006.01)

(52) U.S. Cl.
CPC .......... *G06F 16/245* (2019.01); *G06F 11/362* (2013.01)

(58) Field of Classification Search
None
See application file for complete search history.

(56) References Cited

U.S. PATENT DOCUMENTS

| | | | |
|---|---|---|---|
| 2015/0095885 A1 | 4/2015 | Louvau et al. | |
| 2015/0116110 A1* | 4/2015 | Schuman | G08B 25/08 340/517 |
| 2019/0235942 A1* | 8/2019 | Flohr | G06F 8/65 |
| 2021/0056009 A1 | 2/2021 | Gal et al. | |

OTHER PUBLICATIONS

"U.S. Appl. No. 17/241,745, Non Final Office Action dated Jun. 22, 2021", 6 pgs.
"U.S. Appl. No. 17/241,745, Notice of Allowance dated Oct. 13, 2021", 7 pgs.
"U.S. Appl. No. 17/241,745, Response filed Sep. 22, 2021 to Non Final Office Action dated Jun. 22, 2021", 8 pgs.

* cited by examiner

*Primary Examiner* — Craig C Dorais
(74) *Attorney, Agent, or Firm* — Schwegman Lundberg & Woessner, P.A.

(57) ABSTRACT

Disclosed herein are systems and methods for generating anonymized software-bug alerts from query comments. In an embodiment, a data platform obtains query comments associated with a query, and determines that the query comments include a reference to a software bug of the data platform. In response to making that determination, the data platform generates an anonymized software-bug alert that includes at least part of the query comments, and transmits the anonymized software-bug alert to an endpoint such as a queue of software-bug tickets.

25 Claims, 3 Drawing Sheets

SYSTEMS AND METHODS FOR GENERATING ANONYMIZED SOFTWARE-BUG ALERTS FROM QUERY COMMENTS

CROSS-REFERENCE TO PRIORITY APPLICATIONS

This application is a Continuation of U.S. patent application Ser. No. 17/241,745 filed Apr. 27, 2021, which claims the benefit of U.S. Provisional Application No. 63/143,803 filed Jan. 30, 2021, the contents of which are incorporated herein by reference in their entireties.

TECHNICAL FIELD

Among other topics, the present disclosure relates to data platforms and, more particularly, to systems and methods for rapid detection of software bugs in data platforms.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, a data platform may include one or more databases that are respectively maintained in association with any number of customer accounts, as well as one or more databases associated with one or more system (e.g., administrative) accounts of the data platform, one or more other databases used for administrative purposes, and/or one or more other databases that are maintained in association with one or more other organizations and/or for any other purposes. A data platform may store metadata in association with the data platform in general and in association with particular databases and/or particular customer accounts as well. Metadata that is maintained by a data platform with respect to stored data (e.g., stored customer data) may be referred to herein at times as "expression properties."

Users and/or executing processes (that may be associated with, e.g., a given customer account) may, via one or more types of clients, be able to cause data to be ingested into one or more databases in the data platform, and may also be able to manipulate the data, run queries against the data, create customized views (which are also known as secure views) of the data, modify the data, insert additional data, remove data, and/or the like. Some example types of clients include web interfaces, Java Database Connectivity (JDBC) drivers, Open Database Connectivity (ODBC) drivers, one or more other types of drivers, desktop applications, mobile apps, and the like.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

In data platforms, which is a context in which software plays a very important role, it occurs from time to time that there are software bugs in the code. The more complex an app, application, software suite, etc. gets, the more likely it is that bugs will crop up. Some bugs present as the software doing the opposite of, or at least something inconsistent with, the way that the software was designed to work. Other bugs present as unexpected events that are not necessarily against the design, but not a part of it either. This latter category is sometimes referred to as bugs that are undefined.

Regardless of the particular type, it is often the case that software bugs are prevalent in large enterprise systems among other systems (of any size). The effects of software bugs can be detrimental to both a system operator (e.g., owner), their customers, and/or others. In current implementations, software developers detect bugs in various different ways, a few examples of which are described here. As a first example, their customers may report a bug (or at least suspected bug) and/or aberrant behavior via an email, a web form, a phone call, and/or the like. Second, certain telemetry-based approaches may be used, often involving both monitoring (of parameters, events, etc.) and logging (of parameter values, event occurrences, etc.). Telemetry may involve attempting to detect unwanted and/or adverse behavior of software by preconfiguring some metrics (and thresholds for those metrics) that the developers believe would indicate a problem. Third, developers often run validation tests (e.g., unit tests) on individual pieces and combinations thereof, looking for an expected input/output behavior. Both telemetry and validation testing therefore involve attempts by developers to see into the future and predict what metrics and/or what output(s) would be indicative of problems such as software bugs.

These approaches have other problems as well. With respect to customers reporting bugs, suspected bugs, issues, etc., it is often the case that customers find it difficult to reach someone by phone or to locate a particular page on a data-platform provider's website for submitting a bug report, and so forth. This may deter them from doing so, as may the time it takes even if they can identify a communication channel via which to submit such a report. Moreover, customers—a term used herein to broadly encompass all types of users—may submit reports regarding phenomena that are not bugs, and may also or instead submit reports that simply describe (what they perceive to be) an aberrant behavior of the software but (understandably) do not include specifics as to what code, what function, etc. might include a bug.

More generally, customers (again, very understandably) quite often report effects of bugs rather than causes, when it is the causes that of course would need to be addressed. These various issues can result in significant increases in the amount of time that a given engineer—a term that is used broadly herein to encompass software engineers, programmers, coders, etc.—would need to invest in order to identify, track down, and fix the bug. The engineer may want the data-platform company to reach out to the customer for additional information; the company may not want or otherwise fail to do so, and so forth.

With respect to telemetry, as alluded to above, this type of approach generally involves attempting to detect unwanted and/or adverse behavior of certain software based on specifically defined metrics, and setting up corresponding monitoring, logging, alert triggering, etc. To do so, engineers have to know (or guess) what metrics to choose, what thresholds to set for those metrics, more generally what the potential or likely side effects of a bug might be, and so on. It is possible though quite difficult to identify and watch for situations, events, and the like that have happened only a small number of times or perhaps not at all. In the data-platform context, telemetry may involve monitoring metrics such as how long a given stage of a given query takes to execute, a number of queries executed in a given amount of time, a number of times the executing code proceeded down various logic paths, and so on.

With respect to validation testing (also known as correctness testing, unit testing, system testing, functional validation, output verification, and by other names), by definition the tests are seeking to validate that expected outputs for certain inputs are actually produced by the software when taking those certain inputs. Thus, the "correct" results apply only to specific preconceived scenarios, and most often do not cover all cases of bugs, errors, and the like. It is typically simply not feasible, when dealing with software of even moderate complexity, to exhaustively test all possible inputs. And many times, even if it could be done, it would not be worth the cost to do so.

Among other inspirations and motivations, embodiments of the present disclosure arose in part from the realization and recognition that, although the above-described approaches are among the most prevalent approaches that are used in contemporary software engineering in order to identify software bugs, these approaches, even collectively, are not sufficient. Embodiments of the present disclosure were further inspired by the realization and recognition that customers of data platforms often include comments—with the queries (e.g., Structured Query Language (SQL) queries) that they submit—that make reference to a software bug (or at least suspected software bug) in the operating software of the data platform itself. As is known in the art, comments are very frequently used as non-operative annotations to source code (or other code) itself, often to aid a future reader of that code, and just as often to remind the very programmer that wrote the comments of what they were thinking at the time of writing the associated code.

Some code is compiled into machine language prior to execution; in such cases, the compiling process generally deletes all comments because they are simply extra data that does not impact the operation of the code. Other programming languages, however, such as SQL, JavaScript, Perl, Python, R, and others, are what are known as interpreted languages. Programs that are written in this type of programming language are interpreted directly from source code (by a functional entity that is often referred to as an "interpreter"). Thus, the comments stay with the code with which they are associated. Embodiments of the present disclosure apply generally to any context in which the source code or other code is still in a form in which the comments are still there.

To address these and other shortcomings of prior implementations, disclosed herein are various embodiments of systems and methods for rapid detection of software bugs in data platforms. Some embodiments of the present disclosure leverage textual and historical analyses of such comment data to improve the overall process of bug detection. It is noted that the embodiments of the present disclosure can be used instead of or alongside one, some, or all of the above-described approaches, as well as instead of or alongside one or more other approaches to bug identification. In various embodiments, a comment-analysis system extracts (or receives extracted) comments from queries submitted by customers. The comment-analysis system, in some embodiments, uses techniques such as substring searching, word matching, natural language processing (NLP), machine learning, and/or the like in order to assess whether a given query is accompanied by comments in which the author of the query has referenced a known or suspected software bug. Thus, embodiments of the present disclosure leverage the knowledge and/or theories of many, many customers with respect to possible software bugs in, e.g., a data platform. Moreover, embodiments of the present disclosure do so in a way that is relatively seamless for the customers, preventing them from having to disrupt their day to report a possible bug and/or curing the issue of them not reporting it at all.

Thus, embodiments of the present disclosure relate in some aspects to identifying comments (and/or other annotations referred to by labels other than "comments") in which a user that has submitted a certain quantum of code has indicated the presence of a software bug or a possible or suspected software bug, described a workaround that they use because of a bug or suspected bug, express frustration or annoyance about a bug or suspected bug, and so forth. Moreover, it is noted that, while the terms "bug" and "software bug" are those most prevalently used in this disclosure, the concepts and embodiments described here apply whatever name might be used (e.g., glitch, regression, error, defect, fault, and so on). Regardless of the term, embodiments of the present disclosure look for phrases that include such terms, including "system bug," "platform bug," "[data-platform-provider name] bug," etc.

Furthermore, a number of benefits are provided by embodiments of the present disclosure—some examples of such benefits are listed here, and others will occur to those of skill in the art having the benefit of this disclosure. First, embodiments of the present disclosure result in the software provider (e.g., data-platform provider) being notified of a bug report earlier than they otherwise would have been, if they would have been at all, of course. In some embodiments, the notification is in real-time or near-real-time, essentially contemporaneous with the submission by the customer of the commented query.

Second, due to operations of embodiments of the present disclosure, engineers at the software provider are presented with data that is much more complete than would usually be provided in a given bug report submitted in a conventional way. The engineer is able to see the type of query that was being run, the type of bug that is suspected, and/or the like. In some embodiments, such data is anonymized (e.g., changing a variable name to "integer01," etc.) prior to the engineer ever seeing it. Furthermore, in some embodiments, the data is arranged in a canonical form prior to being presented to the engineer, for reasons including standardizing and organizing the presentation, etc. In some embodiments, multiple queries (from the same customer or multiple customers) that have comments determined to relate to a software bug are combined into a single generalized record to avoid duplicative effort by the engineer. Moreover, forward feedback is used in some embodiments to, over time, improve the performance with respect to correctly identifying comments that are referencing a software bug (i.e., to reduce false positives).

Third, embodiments of the present disclosure enable bugs to be identified even in contexts in which no telemetry monitoring and/or logging has been arranged in advance, again broadening the scope of potential software bugs that can then be identified and addressed. In a sense, in accordance with embodiments of the present disclosure, customers are continuously testing and reporting on the operation of the data platform (or other software, though data platforms are the example that are primarily described in this disclosure). And they are doing so in a way that results in examination of a significantly larger subspace of the set of all possible queries than could or would be covered by contemporary approaches. For one, there are only so many validation tests that an engineer or team of engineers can dream up and/or have time to dream up, much less to conduct. Thus, embodiments of the present disclosure provide improved code coverage with respect to bug identification, operating in such a way as to crowdsource it in a manner of speaking.

As one would expect, in embodiments that include searching query comments for particular character strings or substrings, the number of "hits" (e.g., query comments that are selected for further examination) tends to increase along with factors such as the relative simplicity (e.g., shortness, common word or words, etc.) of the search string, the number of individual search strings (when a match of any one is enough), and so on. This will almost always correlate with more false positives (i.e., query comments being incorrectly flagged as pertaining to a software bug). Conversely, as examples, more specific (e.g., longer, less common words, etc.) search strings and/or fewer total search strings tends to reduce the number of hits while also increasing the number of false negatives (i.e., query comments being incorrectly not flagged as pertaining to a software bug).

As examples, searching (only) for "bug" in the comments would typically yield more hits than searching (only) for "software bug," which would yield more hits than searching (only) for "suspected software bug," and so on. Thus, as is often the case with such things, implementation choices can be made to find a desired point on the spectrum between high precision and fewer hits (i.e., lesser recall/coverage) on the one hand and low precision and more hits (i.e., greater recall/coverage) on the other. Essentially, one can cast a small net or a wide net or any size net in-between, and the results will tend to be shaped accordingly. Such concepts are familiar to those of skill in the art.

In some embodiments, the one or more search strings are selected to err on the side of too many false positives rather than too many false negatives under the thinking that, for example, at least the false positives can be examined whereas the false negatives never will be. In other embodiments, the opposite approach is taken: the one or more search strings are selected to err on the side of too many false negatives rather than too many false positives, the thinking there perhaps including a view that the engineers already have plenty to do, and software bugs may tend to present themselves more than once, such that the engineers will very likely have another chance to fix a bug associated with a false negative. Various different implementations can be arranged to align with various different such preferences.

One embodiment takes the form of a method that includes a comment-analysis system of a data platform receiving query comments associated with a query that was submitted to the data platform. The data platform determines that the query comments include a reference to a software bug of the data platform, and responsively causes one or more software-bug alerts pertaining to the software bug to be transmitted to one or more endpoints.

As described herein, one or more embodiments of the present disclosure take the form of methods that include multiple operations. One or more other embodiments take the form of systems that include at least one hardware processor and that also include one or more computer-storage media (CSM) containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more CSM containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CSM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Figure 1:
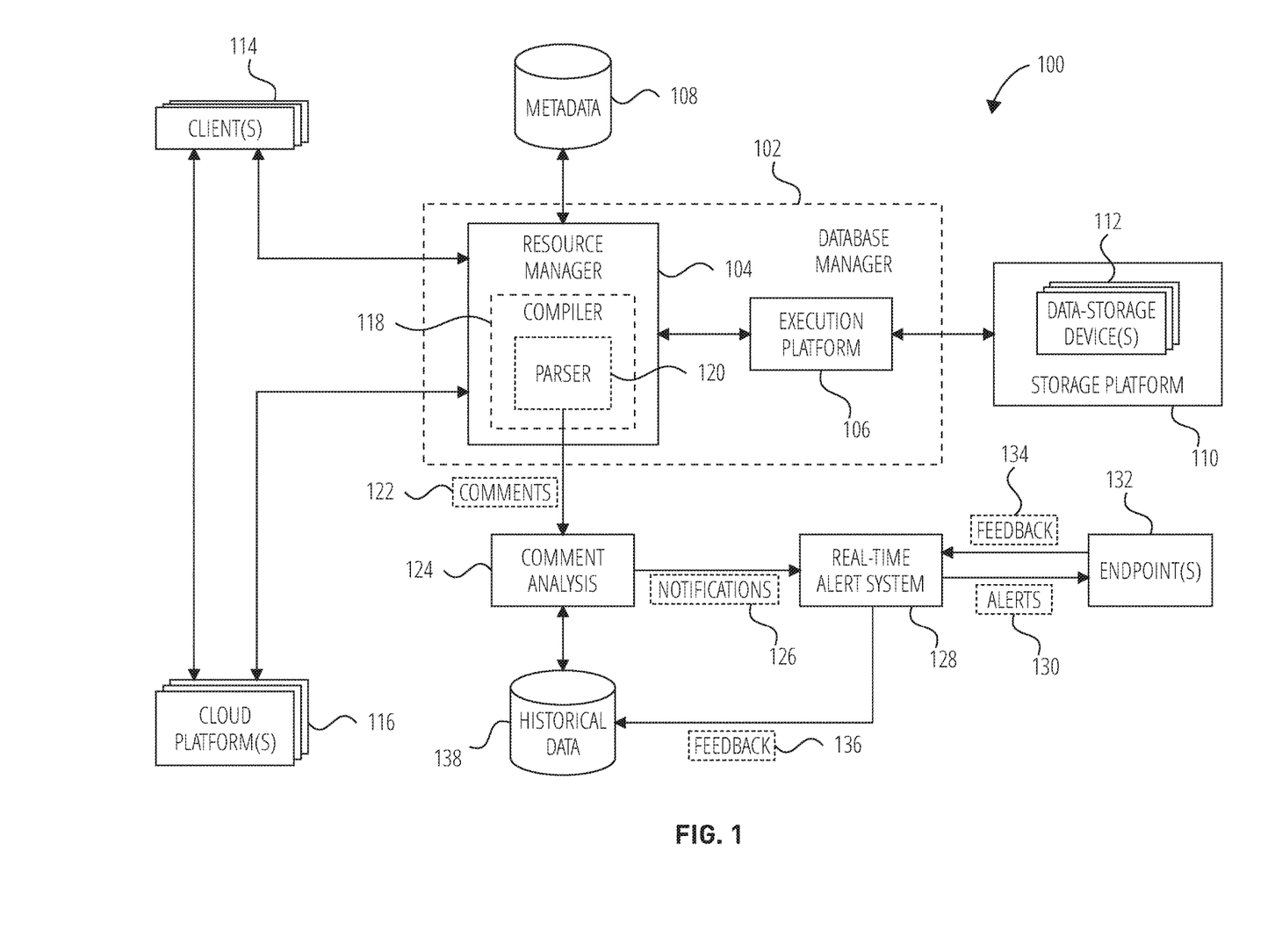
FIG. 1 illustrates an example data platform, in accordance with at least one embodiment.

FIG. 1 illustrates an example data platform 100, in accordance with at least one embodiment. In various embodiments, the data platform 100 may be used for performing one or more of the operations (e.g., one or more of the methods) that are disclosed herein. As a general matter, in at least some embodiments, the data platform 100 can be referred to using terms such as a cloud-based data warehouse, a network-based data warehouse, or simply a data warehouse. A cloud-based data warehouse is one type of network-based data system that can be used for data analysis and reporting, and that includes a central repository of integrated data from one or more disparate sources. A cloud-based data warehouse is commonly an OLAP database that can store current and historical data that can be used for creating analytical reports for an enterprise based on data stored within databases maintained on behalf of the enterprise. To this end, data warehouses often provide business-intelligence (BI) tools, tools to perform extract-transform-load (ETL) tasks for ingesting data into the repository, tools to manage and retrieve metadata, and/or the like. There are other types of cloud-based data warehouses, such as OLTP databases, as well as data warehouses and other data systems that operate with characteristics of multiple types of database systems.

Moreover, prior to proceeding with the balance of this description of FIG. 1, it is noted that any one or more of the components, devices, systems, and/or the like that are depicted in FIG. 1 and in any of the other figures could be implemented as one or more computing devices having an architecture that is similar to the example computing device 300 that is described below in connection with FIG. 3. Moreover, two or more of the entities that are depicted in any of the figures could be combined into a single component, and any entity that is depicted as a single component in any of the figures could instead be distributed across multiple components (e.g., distributed across multiple systems, platforms, and/or the like at one or more geographic locations). Moreover, in particular embodiments, any one or more of the communication links depicted in FIG. 1 and/or in any of the other figures could be implemented using one or more wired-communication links and/or one or more wireless-communication links using any suitable medium (or media) and any suitable communication protocol(s). In some embodiments, one or more of the communication links could be implemented via one or more data-communication networks, which may utilize any communication protocol and any type of communication medium. In some embodiments, at least one such data-communication network is a combination of two or more data-communication networks (or sub-networks) coupled to one another.

As shown in FIG. 1, the data platform 100 includes a database manager 102, which includes a resource manager 104 and an execution platform 106. As depicted, the resource manager 104 includes a compiler 118 that itself includes a parser 120. The database manager 102 need not be a defined physical device, though it could be, but in general is used herein as shorthand to refer to the combination of at least the resource manager 104 and the execution platform 106. The execution platform 106 may include one or more execution nodes (e.g., servers, workers, threads, and/or the like). A grouping of execution nodes in the execution platform 106 may be referred to as a virtual warehouse, and such virtual warehouses are, in some embodiments, dynamically scalable to meet dynamically changing demands. Also depicted in FIG. 1 are a metadata storage 108, a storage platform 110 that includes one or more data-storage devices 112, one or more client 114, one or more cloud platforms 116, a comment-analysis system 124, a real-time alert system 128, one or more endpoints 132, and a historical data repository 138. In various implementations, there could be any number of any of the entities that are shown in FIG. 1.

In some embodiments, all of the entities—other than the one or more cloud platforms 116—that are depicted in FIG. 1 are part of what is referred to herein as the data platform 100, though this is not the case in other embodiments. For example, in at least one embodiment, the data platform 100 does not include any of the one or more client 114. As another example, in some embodiments, the data platform 100 does not include the storage platform 110. In the embodiments that are primarily described herein to illustrate various examples, the data platform 100 includes the database manager 102 (including the resource manager 104 and the execution platform 106), the metadata storage 108, the storage platform 110, the comment-analysis system 124, the real-time alert system 128, at least one of the endpoints 132, and the historical data repository 138—and does not include any of the one or more client 114 or any of the one or more cloud platforms 116. The storage platform 110 could be implemented in whole or in part on a cloud platform and still be considered part of the data platform 100.

The resource manager 104 may be configured to manage a number of different types of tasks including external database tasks (e.g., query requests) that are received from, e.g., a client 114. The resource manager 104 may be coupled to any number of clients 114. A client 114 may facilitate end users making data-storage and/or data-retrieval requests, system administrators managing the data platform 100, and/or the like. In various different embodiments, a client 114 could be a web interface, a JDBC driver, an ODBC driver, a desktop application, a mobile app, and/or another type of client. As shown in FIG. 1, a client 114 may communicate with the storage platform 110 (e.g., the resource manager 104 of the database manager 102) and one or more cloud platforms 116. A client 114 could reside on a client-side computing device on which the client 114 interacts with one or more client-side applications and on which the client 114 makes use of certain client-side-system resources such as network interfaces, user interfaces, memory (e.g., random access memory (RAM)), and/or the like.

As depicted in FIG. 1, the resource manager 104 may be communicatively coupled to the metadata storage 108, which in at least one embodiment is associated with (and reflective of) data stored throughout the data platform 100. Indeed, in some embodiments, the metadata storage 108 includes one or more summaries of data available in one or more local caches (of, e.g., the resource manager 104 and/or the execution platform 106), data stored in the storage platform 110, and/or data stored in the historical data repository 138. Additionally, the metadata storage 108 may include information regarding how data is organized in one or more local caches, one or more storage platforms 110, the historical data repository 138, and/or the like. As mentioned above and as is discussed more fully below, in at least some embodiments, including in the embodiment depicted in FIG. 1, the resource manager 104 includes the compiler 118, which includes the parser 120. Other arrangements are certainly possible.

Among other uses, the metadata storage 108 may allow systems and services of the data platform 100 to determine whether a given quantum of data needs to be processed (in connection with, e.g., a given query) without loading or accessing the actual stored data. In various embodiments, the metadata storage 108 may reflect the contents of one or more databases, one or more tables, one or more columns, one or more materialized views, and/or one or more other collections of records, parts of records, and/or other data quanta. With respect to where the metadata storage 108 is actually stored, a separate (e.g., local) storage location (e.g., a key-value store) is used in some embodiments, while in other embodiments the metadata storage 108 is maintained by the data platform 100 as a subset of the data stored in the storage platform 110. Other architectures are possible as well.

The resource manager 104 is also communicatively coupled to the execution platform 106, which may provide multiple computing resources that execute various tasks involving data storage, data retrieval, data analysis (e.g., query processing), and/or the like. In at least one embodiment, the resource manager 104 includes a layer of code (e.g., Java code) that is global with respect to the data platform 100, where that code layer includes instructions for performing functions such as compiling queries and brokering requests to one or more execution nodes in the execution platform 106. In some embodiments, there exists one or more instances of the execution platform 106 used for executing (i) client tasks, such as database queries and/or (ii) internal database tasks such as updating metadata, clustering tables, generating materialized views, and/or the like. In some such embodiments, there also exists one or more instances of the execution platform 106 used for feature development and/or testing of the data platform 100, and each such instance of the execution platform 106 may be separate from each client-task instance of the execution platform 106, such that, for example, client-task processing is not impacted by feature-development tasks, data-platform-administration tasks, and/or the like.

The execution platform 106 may be coupled to the one or more data-storage devices 112 that are part of the storage platform 110, which may include (and the execution platform 106 may be capable of communicating with) any number of data-storage devices 112. In some embodiments, one or more of the data-storage devices 112 are cloud-based storage devices located in one or more geographic locations. For example, one or more of the data-storage devices 112 may be part of a public cloud infrastructure or a private cloud infrastructure. One or more of the data-storage devices 112 may be or include hard disk drives (HDDs), solid state drives (SSDs), storage clusters, and/or any other data-storage technology. In some examples, the storage platform 110 includes distributed file systems (such as Hadoop Distributed File Systems (HDFSs)), object storage systems, and/or the like.

As shown in FIG. 1, the storage platform 110, including the one or more data-storage devices 112, is decoupled from the computing resources associated with the execution platform 106, the resource manager 104, and the database manager 102 generally. In an embodiment, each of a plurality of data-platform deployments includes a respective storage platform 110 having its own respective one or more data-storage devices. That type of architecture supports dynamic changes to the data platform 100 based on changing data-storage and/or data-retrieval needs, as well as changing needs of users and systems accessing the data platform 100. The support of dynamic changes allows the data platform 100 to scale quickly in response to changing demands on the systems and components within the data platform 100. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

Upon receiving a given query at the resource manager 104, the parser 120 may identify any query comments 122 in that query, and transmit (or the compiler 118 or the resource manager 104 may transmit, etc.) a copy of the query comments 122 to the comment-analysis system 124, as shown in FIG. 1. In some embodiments, queries that contain query comments 122 are transmitted to the comment-analysis system 124 in their entirety, including both the query comments 122 and the SQL code itself. The compiler 118 may separately compile the query, generate a query-execution plan, transmit the plan to the execution platform 106, and receive results back from the execution platform 106. In some instances, the execution platform 106 may generate the query-execution plan. The execution platform 106 (or an instance of an execution platform 106, as the case may be), may manage the execution of the query, including interfacing with the storage platform 110 and assigning various entities to conduct various query-processing-related tasks. Upon completion or perhaps during execution, the execution platform 106 may provide query results to the resource manager 104 for the resource manager 104 to in turn provide those results to the originally requesting client 114.

As discussed more fully below, if the comment-analysis system 124 determines, in some cases with reference to historical data in the historical data repository 138, that a given set of query comments 122 does (or it is likely enough that it does, etc.) include a reference to a software bug in the data platform 100, the comment-analysis system 124 may then send one or more notifications 126 to the real-time alert system 128. Upon receipt of a given such notification 126, the real-time alert system 128 (which may or may not be a part of the data platform 100) may responsively transmit one or more software-bug alert 130 to one or more endpoints 132. A given endpoint 132 could be an email account, a mobile device, an inbox (queue) of software-bug tickets, a display, a printout, data storage, and/or the like. Any given software-bug alert 130 could be textual, visual, audible, tactile, and/or the like.

As also discussed below, one or more endpoints 132 may provide feedback 134 to the real-time alert system 128 (e.g., an engineer may provide feedback 134 to the real-time alert system 128 via a given endpoint 132). In other embodiments, the feedback 134 may pass from a given endpoint 132 directly to the historical data repository 138, directly to the comment-analysis system 124 for analysis and/or storage in the historical data repository 138, and/or some permutation thereof. The feedback 134 could relate to whether or not a given particular instance of query comments 122 actually turned out to correspond to a software bug in the data platform 100, if so whether it's been fixed, etc. In embodiments in which, as depicted in FIG. 1, feedback 134 is transmitted from one or more endpoints 132 to the real-time alert system 128, the real-time alert system 128 may simply pass that feedback 134 through as feedback 136, or may generate the feedback 136 by augmenting and/or altering the feedback 134 in one or more ways.

Figure 2:
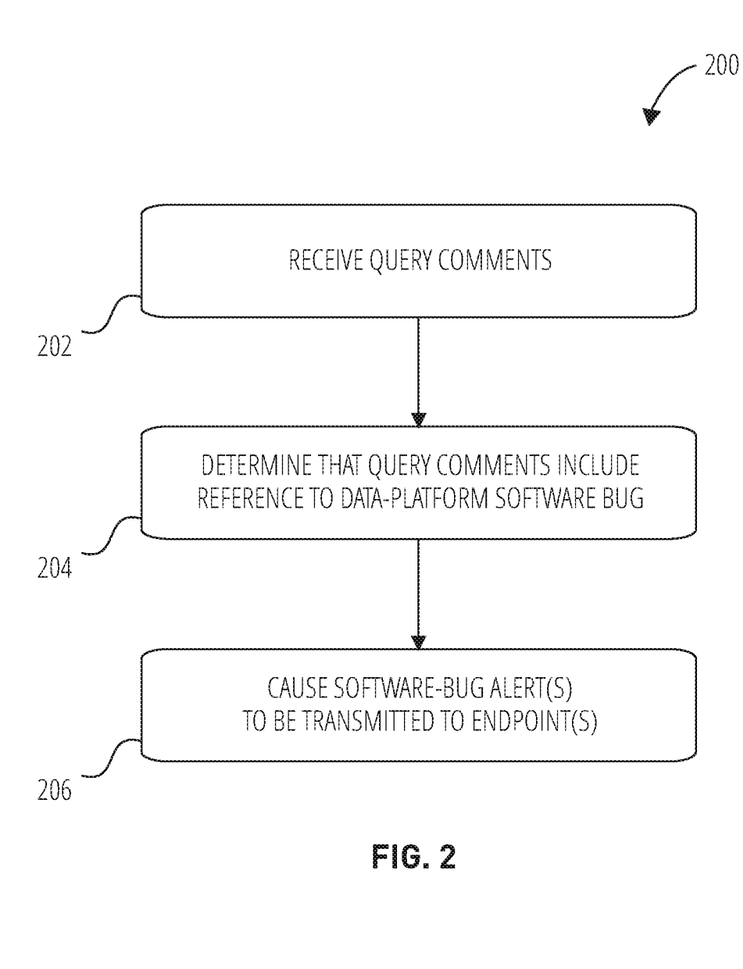
FIG. 2 depicts an example method, in accordance with at least one embodiment.

FIG. 2 depicts a method 200 that is described here by way of example as being performed by the comment-analysis system 124 of FIG. 1, which could be a standalone computer, a server, a server system, a functional part of another entity (e.g., the resource manager 104), and/or the like. In general, the method 200 can be performed by any suitable computing and communication device that is equipped, programmed, and configured to perform the recited functions. As described above, some embodiments of the present disclosure involve processing SQL queries provided by users (e.g., customers). In a typical implementation, whether in the case of SQL query compilation and execution or the same processes in connection with another programming language, it is usually the case that comments (e.g., query comments 122) are simply discarded before further processing. In embodiments of the present disclosure, however, as described herein, query comments 122 are evaluated for the presence of one or more references to one or more software bugs in the data platform 100.

In an embodiment, for a given query, during the parsing phase (which is often the first phase of a query's compilation or a precursor to compilation, etc.), each word (e.g., each sub string of characters in between whitespaces and/or the beginning or end of the query string) is processed to determine whether it belongs to the executable part of the query or is part of the query comments 122. In at least one embodiment, the parser 120 performs this function. If a given query has no comments, the parser may simply treat it as it would any other query in a conventional implementation, passing it forward for compiling, execution, etc. If a given query does include query comments 122, however, the parser 120 may, in addition to still processing the query in the normal pipeline as just described, transmit a copy of the query comments 122 (in some cases along with or as part of a full copy of the query, as well as, in some embodiments, one or more items of user-specific and/or other metadata) to the comment-analysis system 124. As such, the method 200 begins at operation 202 with the comment-analysis system 124 receiving query comments 122, in this example from the parser 120 or more generally from the compiler 118 or resource manager 104, among other options.

At operation 204, the comment-analysis system 124 determines that the query comments 122 include at least one reference to a software bug in the data platform 100. As mentioned above, the software bug could be a known bug, a possible bug, a suspected bug, and/or the like. As also described above, the comment-analysis system 124 may make this determination using any one or any combination of analytical tools and/or models. The comment-analysis system 124 may use word search, string search, sub string search, case-sensitive and/or case-insensitive searching, NLP, one or more machine-learning models (e.g., classifiers), and/or the like.

Typical query comments 122 are human-entered, free-text comments that could be in any language. Indeed, any of the utilized search tools, language processing tools, and/or models could be configured to assess query comments 122 in any one or more spoken/written languages (e.g., English, Spanish, Russian, French, German, etc.). To that end, the comment-analysis system 124 may include a language-identification module to identify a language in which a given set of query comments 122 are written, and select an appropriate model based on that identification. In other embodiments, the query comments 122 may be processed by multiple different models—among other ways in which models in a multiple-model implementation may be distinguished from one another, various ones of these could be configured for various different languages. When using one or more machine-learning models, the comment-analysis system 124 could use static (fixed) models and/or models that are at various times retrained, replaced, etc. Moreover, the comment-analysis system 124 could be configured to operate on queries and/or other segments of code in any suitable programming language (Python, R, etc.).

As part of making the determination at operation 204 that particular query comments 122 include at least one reference to a software bug in the data platform 100, the comment-analysis system 124 may do so with reference to historical data that is stored in the historical data repository 138. As one example use of such data, the comment-analysis system 124 may be able to eliminate duplicates (caused, e.g., by a customer copying and pasting the same query text with the same query comments 122 for use in multiple different queries). The comment-analysis system 124 may be able to check whether some identified text or perhaps a broader swath of text before and/or after some identified text is an exact match of text in a set of query comments 122 that have already resulted in an alert being generated.

Thus, the historical data repository 138 may serve at least two purposes. First, the historical data repository 138 may serve as a data repository for data used as training (or retraining, etc.) data for one or more machine-learning models. Second, the historical data repository 138 may contain other information (such as the aforementioned prior queries, feedback from various engineers, etc.) that the comment-analysis system 124 can use to fine-tune its evaluation of various different instances of query comments 122. Another example of that latter type of information—that could be stored in the historical data repository 138 and used by the comment-analysis system 124 in assessing query comments 122—are identifiers of users, customers, tables, databases, and/or the like that for one reason or another have been marked such that they should be ignored (e.g., not assessed for bug references) by the comment-analysis system 124. Such "ignore" indicia could be set by engineers based on determinations of false alarms, by customers that have opted out of (or not opted in to) having their query comments 122 evaluated for bug references, etc.

Moreover, in some embodiments, customers that, e.g., have opted in may be provided with particular keywords, hashtags, and/or the like that the customers can use in their query comments 122 in order to increase the likelihood that their query comments 122 will be flagged by the comment-analysis system 124 as containing at least one reference to at least one software bug in the data platform 100. Furthermore, multiple different hashtags (for example) could be used to signify different levels of severity of various different suspected bugs, and/or for enabling users to make various other distinctions as deemed suitable by those of skill in the art for a given implementation.

It is noted that word-search and/or string-search implementations may flag query comments 122 due to actually explicitly finding particular words or phrases in the text of the query comments 122, whereas approaches such as machine learning may, by virtue of its training (and perhaps retraining), simply end up flagging sets of query comments 122 that include such terms and phrases, as it is quite often difficult to peel back the curtain or open the hood as it were of a machine-learning model to figure out exactly on what it bases its, e.g., classifications. In any event, whether using a relatively simple word and/or string search, a more complex approach involving one or more machine-learning models, some other approach, or a combination of one or more of those, the comment-analysis system 124 may flag (as containing (e.g., likely containing, containing to a specified confidence value, etc.) sets of query comments 122 that contain strings (in some cases including plurals and other word forms, etc.) such as "bug," "buggy," "error," "regression," "fault," "glitch," "glitchy," "flaw," "defect," "coding error," "issue," "known issue," "intermittent issue," "design side effect," "design flaw," "undocumented behavior," and/or the like.

Moreover, the comment-analysis system 124 may look for such terms preceded by terms such as "platform," "data-platform," "data platform," "software," "[company name of data-platform provider]" (e.g., "software glitch," "platform error," "Queries Я Us bug," etc.) In some embodiments, the comment-analysis system 124 flags query comments 122 that include expressions of disappointment, frustration, annoyance, exasperation, and/or the like, such as "does not work," "doesn't work," "should work," "failed," "failure," "headache," "pain in the neck," profanity, and/or the like. In some cases, the comment-analysis system 124 also or instead flags sets of query comments 122 that contain words and/or phrases indicative of one or more measures that a customer might take to deal with a possible bug, some examples including "hack," "workaround," "kludge," "kluge," "band-aid," "stopgap," "short-term fix," etc. Those of skill in the art having the benefit of this disclosure may well be aware of additional monikers used in the industry for software bugs, expressions of frustration about software bugs, workarounds, and/or the like.

Moreover, it is noted that, in addition to the real-time (or near-real-time) implementations that are primarily discussed herein, embodiments of the present disclosure could also or instead be run as batch processes, for example overnight or on the weekend, etc. A given batch implementation could take the form of running a query on a stored set of queries or log of such queries for a given day and/or the like. An administrative user of the data platform 100 could pick a particular start time and end time for the records to be queried, and search a field such as "description" that may include the full text of both the query and the query comments 122.

Doing both the real-time and the batch analyses in a given implementation may allow a data-platform operator to, for example, use "stronger" models in the batch processes and more "lightweight" models in the real-time processes. A stronger model may be one that requires relatively more processing time, processing resources, memory, etc., whereas a more lightweight model may be one that would take less time and fewer processing resources, memory, etc. to execute. As one would expect, there is typically a tradeoff where the stronger models can find more nuanced relationships and do a "deeper dive," whereas the more lightweight models are faster but may not catch as many bug references. Thus, the lightweight model may have more false negatives, but those could be picked up by the more heavyweight models that can operate in what is downtime for many of the other entities described herein.

In some embodiments, for example some embodiments in which one or more machine-learning models are used at operation 204, the comment-analysis system 124 may only consider a result (e.g., an indication that a given set of query comments 122 does include a software-bug reference) to be a positive result if that result is accompanied by a confidence score that is above a predetermined threshold. In other embodiments, the comment-analysis system 124 may factor current personnel into such a decision. For example, if only one engineer is available at a particular time, the comment-analysis system 124 may require a higher confidence score in order to declare a result to be a positive (that would result in sending one or more notifications and/or one or more alerts, etc.). In another case, if more engineers are currently available, and perhaps if there is some indication that they are not busy (e.g., a software-bug queue has fewer than a certain threshold number of tickets in it), the comment-analysis system 124 may consider a lower confidence score (e.g., have a lower threshold) to be sufficient to trigger a software-bug alert. Moreover, some or all of these operations could be performed by, e.g., the real-time alert system 128 instead of the comment-analysis system 124. In general, as stated above, various different operations can be distributed among various different entities and still fall within the scope of the present disclosure.

At operation 206, in response to making the determination at operation 204 that the query comments 122 that are currently being evaluated do include at least one reference to at least one software bug of the data platform 100, the comment-analysis system 124 causes one or more software-bug alerts 130 to be transmitted to one or more endpoints 132. In an embodiment, operation 206 involves the comment-analysis system 124 transmitting one or more notifications 126 to the real-time alert system 128, which in turn manages the generation, formatting, distribution, etc. of one or more software-bug alerts 130 to one or more of the endpoints 132. In other embodiments, the comment-analysis system 124 handles the distribution of software-bug alerts 130 to endpoints 132, among other architectures that could be used.

Upon receiving a given software-bug alert 130 at a given endpoint 132, an engineer may review the query and query comments 122 and investigate whether a corresponding software bug exists, potentially exists, or doesn't exist. After investigating and possible remedying the software bug, the engineer may use the endpoint 132 or another interface to communicate a summary to the historical data repository 138, to the comment-analysis system 124, to the historical data repository 138 via the comment-analysis system 124, to the historical data repository 138 via the real-time alert system 128, and/or the like. The engineer may convey in the feedback 134/136 whether there was a bug and what was done about it. The engineer may also include a categorization of the type of software bug in order to enhance future software-bug alerts 130. The indication of whether or not the comment-analysis system 124 got it right as to the query comments 122 including a reference to a software bug in the data platform 100 can be used as part of the training data to retrain and further refine one or more machine-learning models of the comment-analysis system 124. Moreover, the feedback 134/136 may include indicia from the engineer about idiosyncratic ways in which a bug was described or identified (e.g., a new nickname for a software bug) in the query comments 122. This synonym for software bug could then be added to a global or customer-specific list of such words for which to search, among other options.

In general, the feedback 134/136 can be used over time as part of a forward-feedback loop to reduce the number of false positives and false negatives. As an overall matter, it may be the case that it proves more difficult to learn from and reduce false positives than it is to learn from and reduce false negatives. This may be because, by definition, false positives get evaluated and false negatives never get seen. In some instances, if, for example, a customer calls the data-platform provider to inquire about a particular software bug or suspected bug, an engineer (or other technical person) that is working on that ticket may identify that the query and comments about which the customer is calling probably should have been flagged as a positive but were not; in other words, they were a false negative. In such a case, the person working on the ticket could go in and reclassify that query and its comments as a positive, to assist the comment-analysis system 124 in being more accurate going forward. Other such reconciliations between bugs found via other methods and false negatives could be similarly handled.

Moreover, as mentioned elsewhere in this disclosure, it is recognized that privacy and confidentiality concerns may arise in connection with various embodiments of the present disclosure. For this reason, a data-platform provider may notify existing and new customers of this functionality, and give them the option to opt out (or have them opted out by default and give them the option to opt in, etc.). In some instances, the data may be medical or otherwise personal in nature and may be covered by privacy laws such as the Health Insurance Portability and Accountability Act (HIPPA), the General Data Protection Regulation (GDPR), and/or the like.

In some implementations, the first time (or each time, or every week or month, etc.) a customer submits a query having comments that the comment-analysis system 124 determines to contain reference to at least one software bug, the user could be prompted with the opportunity to opt in or out of this type of comment analysis, to submit a software-bug ticket right there, to confirm that their comments indicate a bug or suspected bug, and/or the like. As described above, customers that are participating may be provided in some embodiments with particular hashtags or other indicia that will flag for the comment-analysis system 124 that a software bug is indeed being referenced in those comments.

In some embodiments, the comment-analysis system 124 and/or the real-time alert system 128 reorganize and/or anonymize the query and/or comment data. In some embodiments, the comment-analysis system 124 may transform the data into a derivative form (e.g., all or a portion of a query-execution-plan graph) or other summary. The comment-analysis system 124 and/or the real-time alert system 128 may standardize the manner in which query data and/or query-comment data is presented in the notifications 126 and/or the software-bug alerts 130. This standardization may relate to organization of different data fields, formatting of various fields and/or values, and/or the like.

In some embodiments, in addition to or instead of canonicalizing the query and comment data, the comment-analysis system 124 anonymizes it. This may involve automatically changing table names to genericized names, and may also or instead involve changing variable names, column names, and/or the like to simply convey the data type rather than a customer-given name. As an example, a customer-given column name could be changed from something like "salesGoals" to "float01Data" or the like.

Furthermore, canonicalizing query and comment data can also or instead involve generating a genericized set of query and comment data to represent multiple different sets of actual query and comment data that came from the same customer, multiple different customers, and/or the like. This could serve both the functions of saving the engineers from conducting duplicate software-bug investigations as well as anonymizing the data. In this way, nearly identical and/or semantically equivalent queries and/or the like can be collapsed into what amounts to a summary or representative record that conveys data types, table types, column types, functions involved, file formats, and/or the like.

Figure 3:
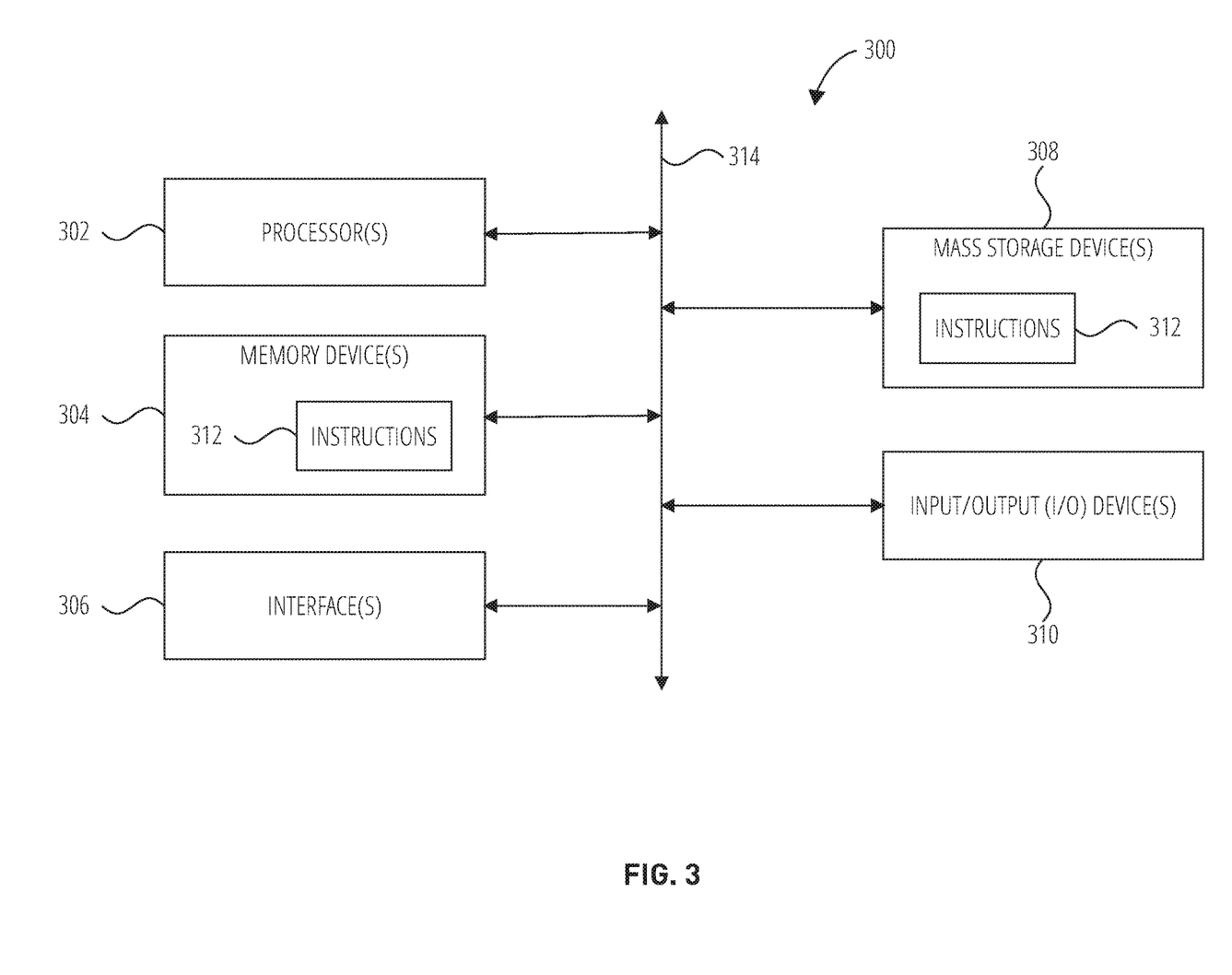
FIG. 3 illustrates an example computing device, in accordance with at least one embodiment.

FIG. 3 illustrates an example computing device 300, in accordance with at least one embodiment. In some embodiments, the computing device 300 is used to implement one or more of the systems and components discussed herein. Further, the computing device 300 may interact with any of the systems and components described herein. Accordingly, the computing device 300 may be used to perform various procedures and tasks, such as those discussed herein. The computing device 300 can function as a server, a client, or any other computing entity. The computing device 300 can be any of a wide variety of computing devices, such as a desktop computer, a notebook computer, a server computer, a handheld computer, a mobile device, a tablet, and/or the like.

In the depicted embodiment, the computing device 300 includes one or more processor(s) 302, one or more memory device(s) 304, one or more interface(s) 306, one or more mass storage device(s) 308, and one or more input/output device(s) 310, all of which are coupled to a bus 314. The processor(s) 302 includes one or more processors or controllers that execute instructions stored in the memory device(s) 304 and/or the mass storage device(s) 308.

The memory device(s) 304 can include various computer-storage media, such as volatile memory (e.g., random access memory (RAM)) and/or nonvolatile memory (e.g., read-only memory (ROM)). The memory device(s) 304 may also include rewritable ROM, such as Flash memory. The processor(s) 302 may also include various types of computer-storage media, such as cache memory.

The interface(s) 306 may include various interfaces that allow the computing device 300 to interact with other systems, devices, computing environments, and/or the like. Example interface(s) 306 include any number of different network interfaces, such as interfaces to local area networks (LANs), wide area networks (WANs), wireless networks, the Internet, and/or the like.

The mass storage device(s) 308 may include various computer-storage media, such as magnetic tapes, magnetic disks, optical disks, solid-state memory (e.g., Flash memory), and so forth. Various drives may also be included in the mass storage device(s) 308 to enable reading from and/or writing to the various computer-storage media. The mass storage device(s) 308 may include removable media and/or non-removable media.

The input/output device(s) 310 may include various devices that allow data and/or other information to be input to and/or retrieved from the computing device 300. Example input/output device(s) 310 include cursor-control devices, keyboards, keypads, microphones, monitors or other display devices, speakers, printers, network interface cards, modems, lenses, CCDs or other image-capture devices, and the like.

The bus 314 allows the processor(s) 302, the memory device(s) 304, the interface(s) 306, the mass storage device(s) 308, and the input/output device(s) 310 to communicate with one another, as well as with other devices or components that may be coupled to the bus 314. The bus 314 represents one or more of several types of bus structures, such as a system bus, a PCI bus, an IEEE 1394 bus, a USB bus, and/or the like. In some examples, the bus 314 includes one or more network connections.

For purposes of illustration, programs and other executable program components are shown herein as discrete blocks, although it is understood that such programs and components may reside at various times in different storage components of the computing device 300 and are executed by the processor(s) 302. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The various memories may store one or more sets of instructions 312 and data structures (e.g., software) embodying or utilized by any one or more of the methodologies or functions described herein. These instructions 312, when executed by the processor(s) 302, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM or E2PROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and one or more utilized couplings may be Code Division Multiple Access (CDMA) connections, Global System for Mobile communications (GSM) connections, or another type of cellular or wireless coupling. In this example, a coupling may implement any of a variety of types of data-transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 312 may be transmitted or received over a network using a transmission medium via a network interface device (e.g., a network interface component) and utilizing any one of a number of well-known transfer protocols (e.g., hypertext transfer protocol (HTTP)). Similarly, the instructions 312 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 312 for execution by the computing device 300, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

Furthermore, in any instances in this disclosure, including in the claims, in which numeric modifiers such as "first," "second," "third," etc. are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, one or more components of one or more devices, systems, and/or the like may be referred to in this disclosure as "modules" that perform (execute, carry out, etc.) various operations. If and as used in the present disclosure, a "module" includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more hardware processors.

The instructions for a given module are executable by the hardware for carrying out the one or more herein-described operations of the module, and could include hardware (e.g., hardwired) instructions, firmware instructions, software instructions, and/or the like, stored in any one or more CSM deemed suitable by those of skill in the art for a given implementation. Each such CSM could be or include memory (e.g., random access memory (RAM), read-only memory (ROM), erasable programmable read-only memory (EPROM), electrically erasable programmable read-only memory (EEPROM or EPROM), Flash memory, and/or one or more other types of memory) and/or one or more other types of CSM. A module could be realized as a single component or be distributed across multiple components as deemed suitable by those of skill in the art for a given implementation.

Moreover, consistent with the fact that the entities and arrangements that are described herein, including the entities and arrangements that are depicted in and described in connection with the drawings, are presented as examples and not by way of limitation, any and all statements or other indications as to what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively self-qualified by such a clause. It is for reasons akin to brevity and clarity of presentation that this implied clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases. It is further noted that, as used in this specification and in the appended claims, the singular forms "a," "an," and "the" include plural referents unless the context clearly dictates otherwise. Moreover, as used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as FPGAs, programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive. Those having skill in the art will appreciate that many changes may be made to the details of the above-described embodiments without departing from the underlying principles of the disclosure. The scope of the present disclosure should, therefore, be determined only by the claims.

The invention claimed is:

1. A method performed by a data platform by executing instructions on at least one hardware processor, the method comprising:
    obtaining query comments associated with a query;
    determining that the query comments include a reference to a software bug of the data platform; and
    responsive to determining that the query comments include a reference to a software bug of the data platform:
        generating an anonymized software-bug alert comprising at least part of the query comments; and
        transmitting the anonymized software-bug alert to an endpoint.

2. The method of claim 1, wherein determining that the query comments include a reference to a software bug of the data platform comprises determining that the query comments include at least one term of frustration.

3. The method of claim 1, wherein determining that the query comments include a reference to a software bug of the data platform is based at least in part on historical data regarding software bugs previously identified from query comments.

4. The method of claim 1, wherein the first software-bug alert includes a content of the query.

5. The method of claim 4, wherein generating the anonymized software-bug alert comprising at least part of the query comments comprises changing at least one variable name from the query to a generic variable name in the anonymized software-bug alert.

6. The method of claim 4, wherein generating the anonymized software-bug alert comprising at least part of the query comments comprises changing at least one table name from the query to a generic table name in the anonymized software-bug alert.

7. The method of claim 1, further comprising including, in the anonymized software-bug alert, one or both of a query type of the query and a suspected type of software bug.

8. The method of claim 1, further comprising aggregating query comments associated with multiple queries based on determining that the query comments associated with the multiple queries pertain to a same suspected software bug.

9. The method of claim 1, wherein the endpoint comprises a queue of software-bug tickets.

10. The method of claim 1, further comprising transmitting the anonymized software-bug alert to one or more additional endpoints.

11. A data platform comprising:
at least one processor; and
one or more non-transitory computer readable storage media containing instructions that, when executed by the at least one processor, cause the data platform to perform operations comprising:
obtaining query comments associated with a query;
determining that the query comments include a reference to a software bug of the data platform; and
responsive to determining that the query comments include a reference to a software bug of the data platform:
generating an anonymized software-bug alert comprising at least part of the query comments; and
transmitting the anonymized software-bug alert to an endpoint.

12. The data platform of claim 11, wherein determining that the query comments include a reference to a software bug of the data platform comprises determining that the query comments include at least one term of frustration.

13. The data platform of claim 11, wherein determining that the query comments include a reference to a software bug of the data platform is based at least in part on historical data regarding software bugs previously identified from query comments.

14. The data platform of claim 11, wherein the first software-bug alert includes a content of the query.

15. The data platform of claim 14, wherein generating the anonymized software-bug alert comprising at least part of the query comments comprises changing at least one variable name from the query to a generic variable name in the anonymized software-bug alert.

16. The data platform of claim 14, wherein generating the anonymized software-bug alert comprising at least part of the query comments comprises changing at least one table name from the query to a generic table name in the anonymized software-bug alert.

17. The data platform of claim 11, the operations further comprising including, in the anonymized software-bug alert, one or both of a query type of the query and a suspected type of software bug.

18. The data platform of claim 11, the operations further comprising aggregating query comments associated with multiple queries based on determining that the query comments associated with the multiple queries pertain to a same suspected software bug.

19. The data platform of claim 11, wherein the endpoint comprises a queue of software-bug tickets.

20. The data platform of claim 11, the operations further comprising transmitting the anonymized software-bug alert to one or more additional endpoints.

21. One or more non-transitory computer readable storage media containing instructions that, when executed by at least one hardware processor of a data platform, cause the data platform to perform operations comprising:
obtaining query comments associated with a query;
determining that the query comments include a reference to a software bug of the data platform; and
responsive to determining that the query comments include a reference to a software bug of the data platform:
generating an anonymized software-bug alert comprising at least part of the query comments; and
transmitting the anonymized software-bug alert to an endpoint.

22. The one or more non-transitory computer readable storage media of claim 21, wherein determining that the query comments include a reference to a software bug of the data platform comprises determining that the query comments include at least one term of frustration.

23. The one or more non-transitory computer readable storage media of claim 21, wherein determining that the query comments include a reference to a software bug of the data platform is based at least in part on historical data regarding software bugs previously identified from query comments.

24. The one or more non-transitory computer readable storage media of claim 21, wherein the first software-bug alert includes a content of the query.

25. The one or more non-transitory computer readable storage media of claim 21, the operations further comprising aggregating query comments associated with multiple queries based on determining that the query comments associated with the multiple queries pertain to a same suspected software bug.

* * * * *